(12) United States Patent
Huang et al.

(10) Patent No.: US 7,494,273 B2
(45) Date of Patent: Feb. 24, 2009

(54) EAR THERMOMETER WITH A SIMPLE-STRUCTURE AND EASY-OPERATION PROBE-COVER DETACHING MECHANISM

(75) Inventors: James Huang, HsinChu (TW); Eileen Chen, HsinChu (TW)

(73) Assignee: Radiant Innovation Inc., Hsinchu (TW)

( * ) Notice: Subject to any disclaimer, the term of this patent is extended or adjusted under 35 U.S.C. 154(b) by 116 days.

(21) Appl. No.: 11/517,409

(22) Filed: Sep. 8, 2006

(65) Prior Publication Data

US 2007/0058692 A1    Mar. 15, 2007

(30) Foreign Application Priority Data

Sep. 9, 2005    (TW) .............................. 94131115 A

(51) Int. Cl.
*G01K 11/00*    (2006.01)
*G01K 1/00*    (2006.01)

(52) U.S. Cl. ........................ 374/158; 374/209; 600/474; 600/549

(58) Field of Classification Search ................. 374/158, 374/209, 131; 600/474; 702/131, 135
See application file for complete search history.

(56) References Cited

U.S. PATENT DOCUMENTS 6,001,066 A    12/1999    Canfield et al.
6,186,959 B1 *    2/2001    Canfield et al. ............. 600/559
6,786,636 B1 *    9/2004    Huang et al. ................ 374/158

FOREIGN PATENT DOCUMENTS

CN    2636214 Y    8/2004

* cited by examiner

*Primary Examiner*—Gail Verbitsky
*Assistant Examiner*—Mirellys Jagan
(74) *Attorney, Agent, or Firm*—Rosenberg, Klein & Lee

(57) ABSTRACT

The present invention discloses an ear thermometer with a simple-structure and easy-operation probe-cover detaching mechanism, which comprises a body having a probe and a detaching element installed to the bottom of the probe. The detaching element can be directly operated by a finger. After measurement, the user can use the detaching element to exert an outward force on a probe cover sleeving the probe and reject the probe cover from the probe. Further, the detaching element may be made of a metallic material, and magnetic elements are arranged at the corresponding positions of the probe bottom; thereby, the detaching element can be automatically restored to its original position by the attractive force of the magnetic elements. Therefore, the present invention provides an ear thermometer, which can easily reject a probe cover from the probe and has the advantages of simple structure and easy operation.

11 Claims, 9 Drawing Sheets

EAR THERMOMETER WITH A SIMPLE-STRUCTURE AND EASY-OPERATION PROBE-COVER DETACHING MECHANISM

BACKGROUND OF THE INVENTION

1. Field of the Invention

The present invention relates to a detector for clinical temperature, particularly to an ear thermometer with a simple-structure and easy-operation probe-cover detaching mechanism.

2. Description of the Related Art

With the advance of science and technology, the clinical temperature has evolved from the traditional mercurial clinical thermometer to various electronic clinical thermometers, such as ear thermometers and forehead thermometers. Owing to its accuracy, convenience and fast response, the ear thermometer has become the mainstream of clinical temperature measurement.

In measurement, the probe of an ear thermometer is inserted into the ear canal of a testee to detect the electromagnetic wave radiating from the body of the testee, and the temperature of the testee is calculated from the detected electromagnetic wave. In such a kind of measurement, the ear thermometer has to directly contact the human body; for the sake of hygiene, the probe of the ear thermometer is sleeved with a probe cover; and after measurement, the probe cover is rejected from the probe and abandoned.

Generally, the conventional ear thermometer has a detaching mechanism to conveniently reject the probe cover. Refer to FIG. 1 for an ear thermometer having a probe-cover detaching mechanism proposed by a U.S. Pat. No. 6,001,066. In the conventional technology, before a measurement, the user sleeves the probe 12 of an ear thermometer 10 with a probe cover 14; after the measurement, the user operates a detaching mechanism 18 at the probe 12 with a button 16 on the ear thermometer 10 to reject the probe cover 14 from the probe 12. However, the conventional probe-cover detaching mechanism of the ear thermometer has a complicated structure and has the disadvantages of complicated assemblage and higher cost. Besides, the conventional probe-cover detaching mechanism needs a greater force to operate.

Accordingly, the present invention proposes an ear thermometer with a simple-structure and easy-operation probe-cover detaching mechanism to overcome the problems mentioned above.

SUMMARY OF THE INVENTION

The primary objective of the present invention is to provide an ear thermometer with a simple-structure and easy-operation probe-cover detaching mechanism, wherein the detaching element for rejecting a probe cover has the advantages of simple structure and easy assemblage, and the detaching element can be automatically restored to the original position.

Another objective of the present invention is to provide an ear thermometer, wherein the probe cover sleeving the probe can be easily detached with a smaller force.

Still another objective of the present invention is to provide an ear thermometer, wherein the operation of detaching the probe cover sleeving the probe is simple and convenient.

Further another objective of the present invention is to provide a detaching element for rejecting the probe cover of an ear thermometer, which has the advantages of simple structure and low cost.

According to one aspect, the ear thermometer of the present invention has a body, and the front end of the body has a probe, and the bottom of the probe has a detaching element. The detaching element can be directly operated by a finger. After a measurement, the user can use the detaching element to exert an outward force on a probe cover sleeving the probe and reject the probe cover from the probe. Further, the detaching element can be made of a metallic material, and magnetic elements are arranged at the corresponding positions in the probe bottom; thereby, after being pushed forward, the detaching element will be automatically restored to its original position by the attractive force of the magnetic elements.

To enable the objectives, technical contents, characteristics and accomplishments of the present invention to be easily understood, the embodiments of the present invention are to be described in detail in cooperation with the attached drawings below.

DETAILED DESCRIPTION OF THE INVENTION

The present invention utilizes a detaching element installed at the bottom of the probe to easily reject a probe cover from the probe after a clinical temperature measurement.

Figure 1:
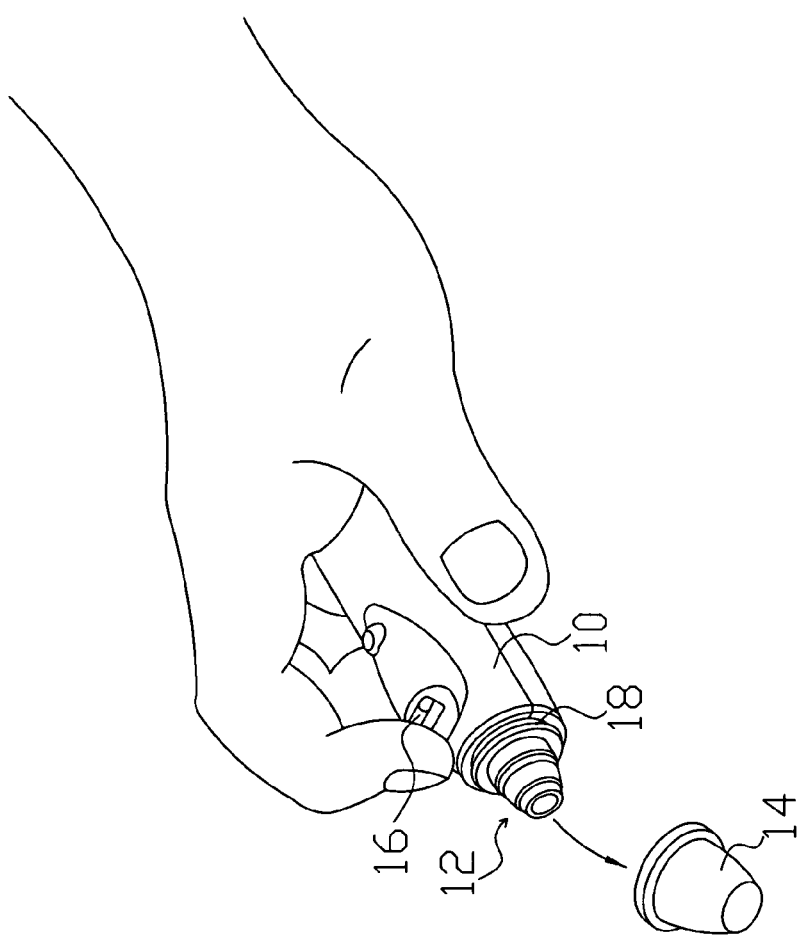
FIG. 1 is a diagram schematically showing a conventional detaching mechanism of an ear thermometer is used to reject a probe cover.
Figure 2:
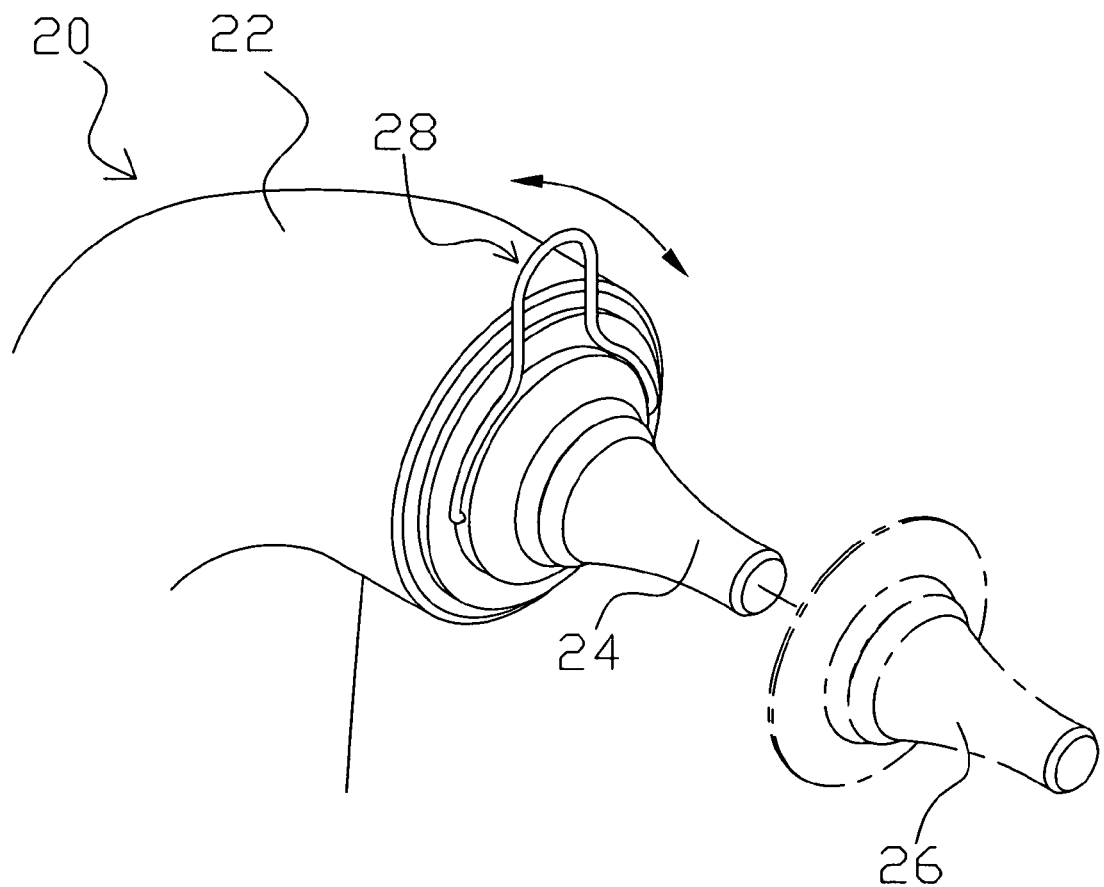
FIG. 2 is a perspective view schematically showing the ear thermometer according to the present invention.
Figure 4:
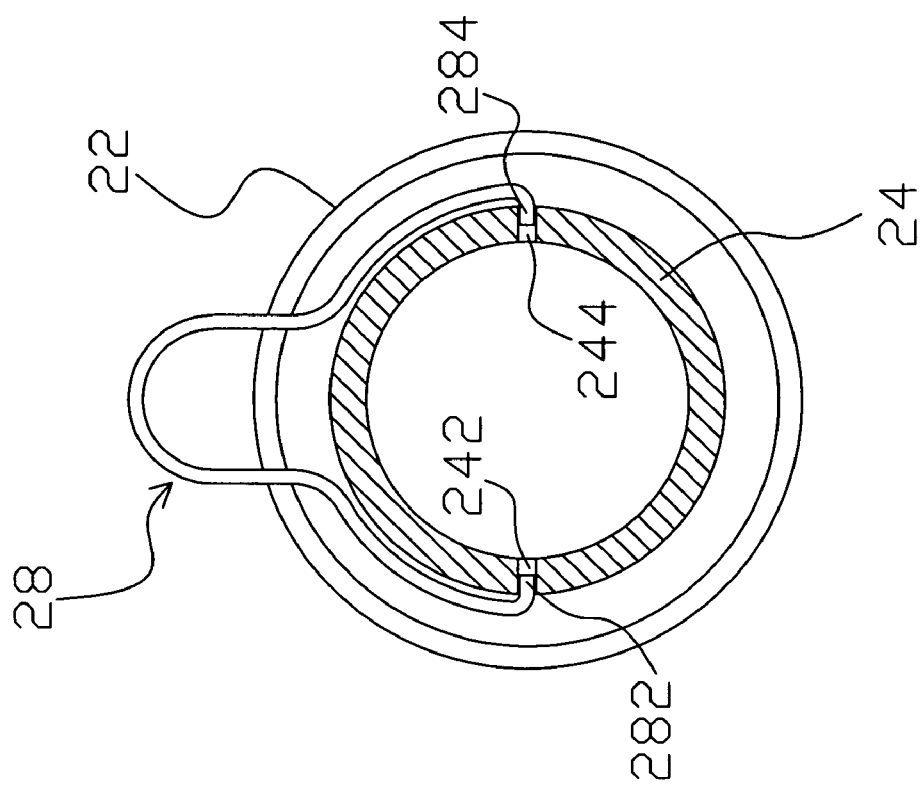
FIG. 4 is a front sectional view schematically showing the ear thermometer according to the present invention.
Figure 3:
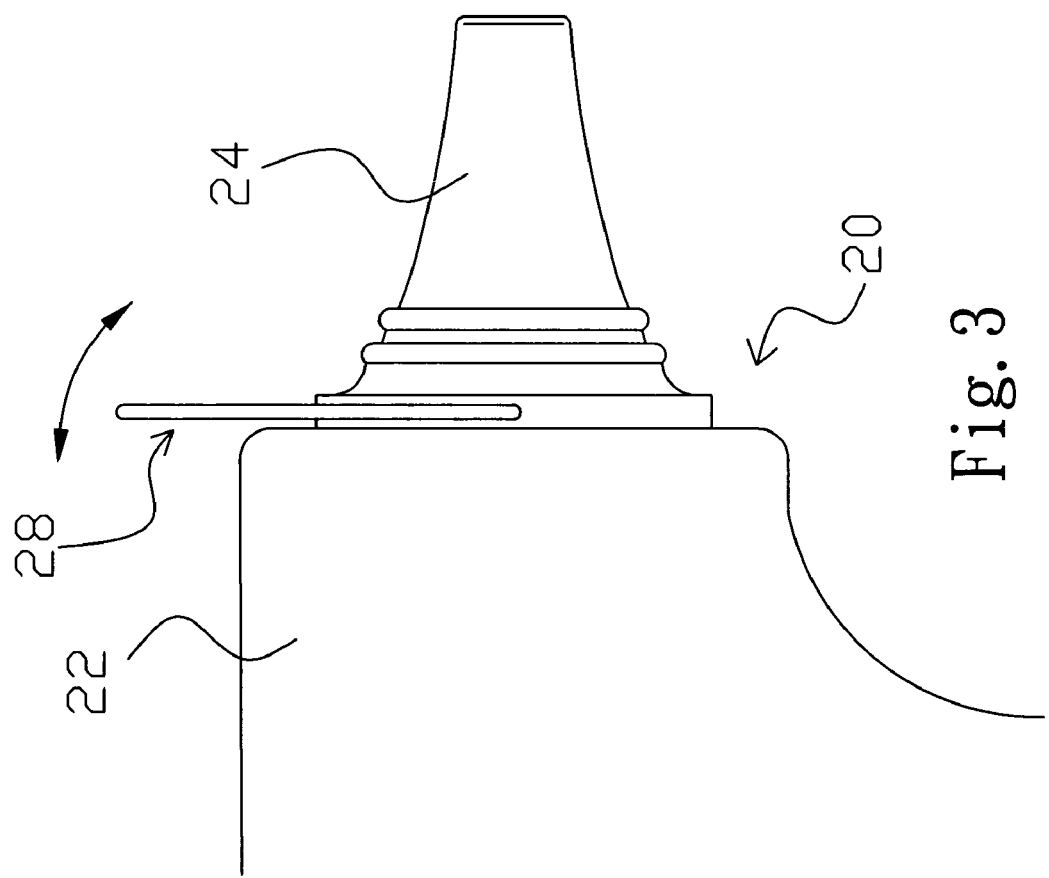
FIG. 3 is a side view schematically showing the ear thermometer according to the present invention.
Figure 5:
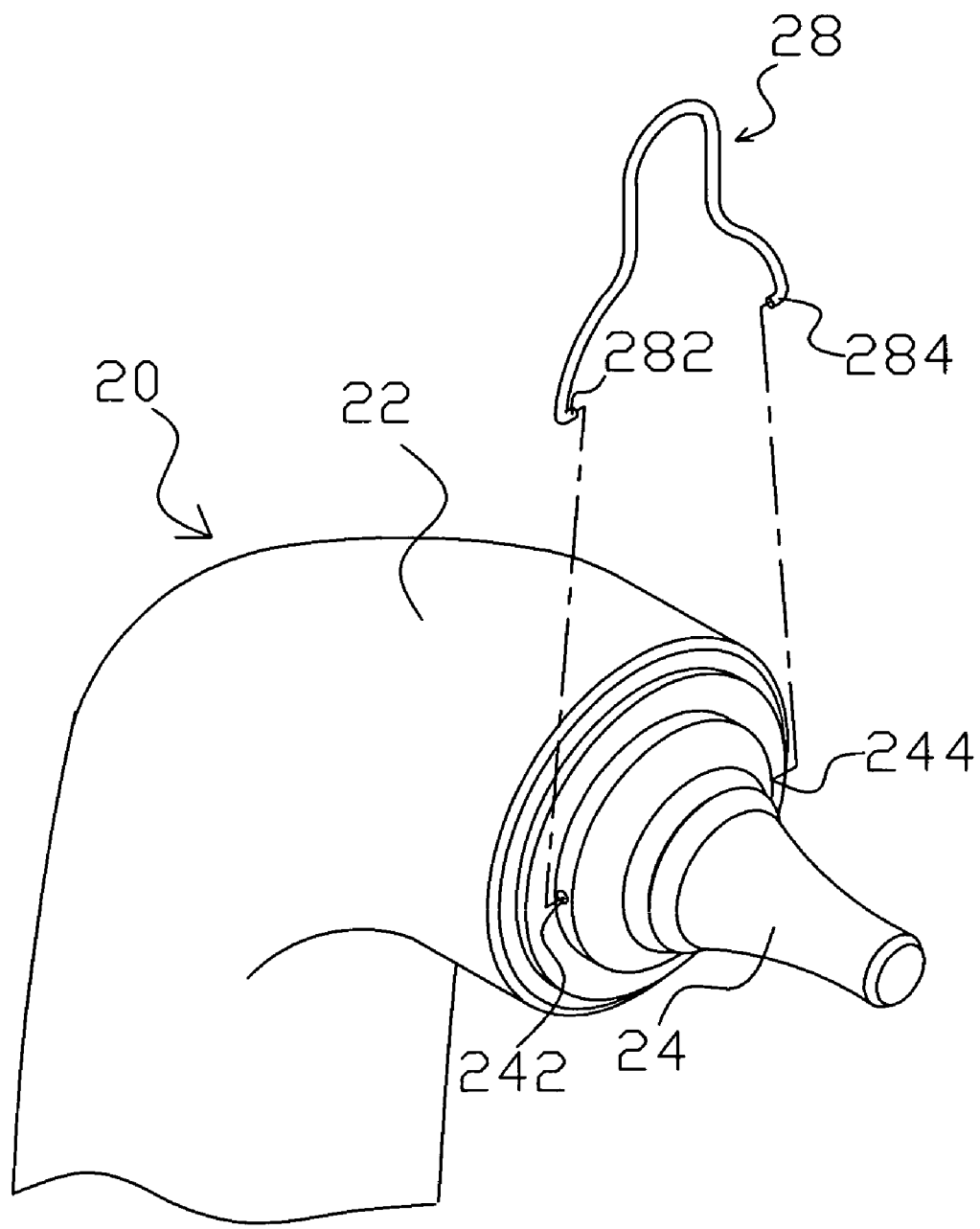
FIG. 5 is an exploded view schematically showing the ear thermometer according to the present invention;.

Refer to FIG. 2 a perspective view schematically showing the ear thermometer according to the present invention. As shown in FIG. 2, the ear thermometer 20 has a body 22, and the front end of the body 22 has a probe 24, which can be sleeved by a probe cover 26 when a measurement is to be undertaken. Refer to FIG. 3. A detaching element 28 made of a plastic material or a metallic material is installed at the bottom of the probe 24, and the detaching element 28 can be moved back and forth by applying a force. Refer to FIG. 4 and FIG. 5. In this embodiment, two symmetric press-fit holes 242 and 244 are formed at the bottom of the probe 24, and two ends of the detaching element 28 respectively have press-fit tips 282 and 284 corresponding to the press-fit holes 242 and 244 of the probe 24. The detaching element 28 is installed to the bottom of the probe 24 via respectively press-fitting the press-fit tips 282 and 284 of the detaching element 28 into the press-fit holes 242 and 244 of the probe 24. Thereby, the detaching element 28 can be moved back and forth pivotally with respect to the press-fit portions by applying a force.

Thus, the detaching element 28 for rejecting the probe cover 26 has a simple structure and can be easily assembled to the ear thermometer 20.

Figure 6:
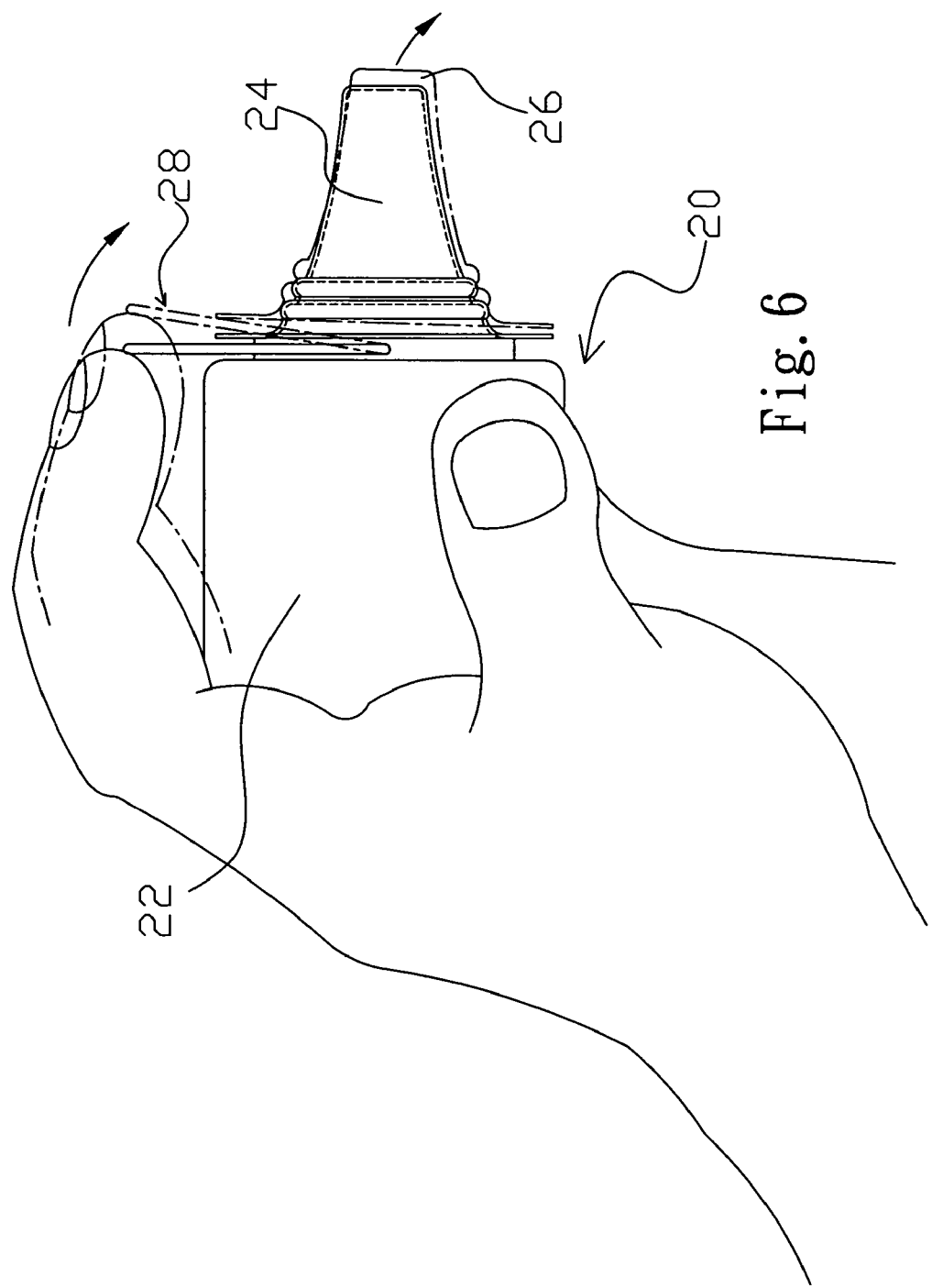
FIG. 6 is a diagram schematically showing that the detaching element according to the present invention is used to reject a probe cover.

Refer to FIG. 6. When the user intends to use the ear thermometer 20 to perform a clinical temperature measurement, he sleeves the probe 24 with the probe cover 26 and then inserts the probe 24 into the ear canal of the testee. After the measurement, the user can use one finger of the hand holding the body 22 to push forward the detaching element 28, and the probe cover 26 is thus rejected from the probe 24. Thereby, after the measurement, the user can easily reject the probe cover 26 from the ear thermometer 20 without contacting the probe cover 26.

Figure 7:
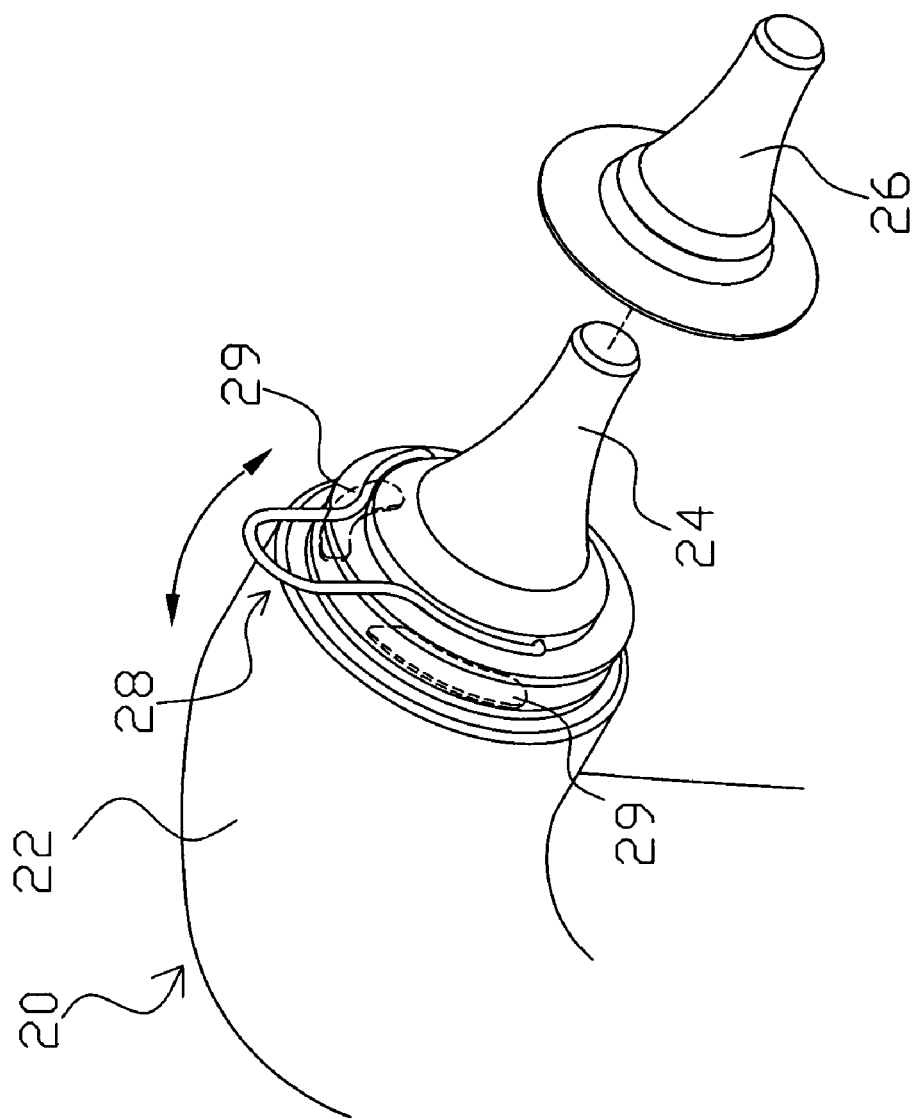
FIG. 7 is a diagram schematically showing another embodiment of the present invention.
Figure 8:
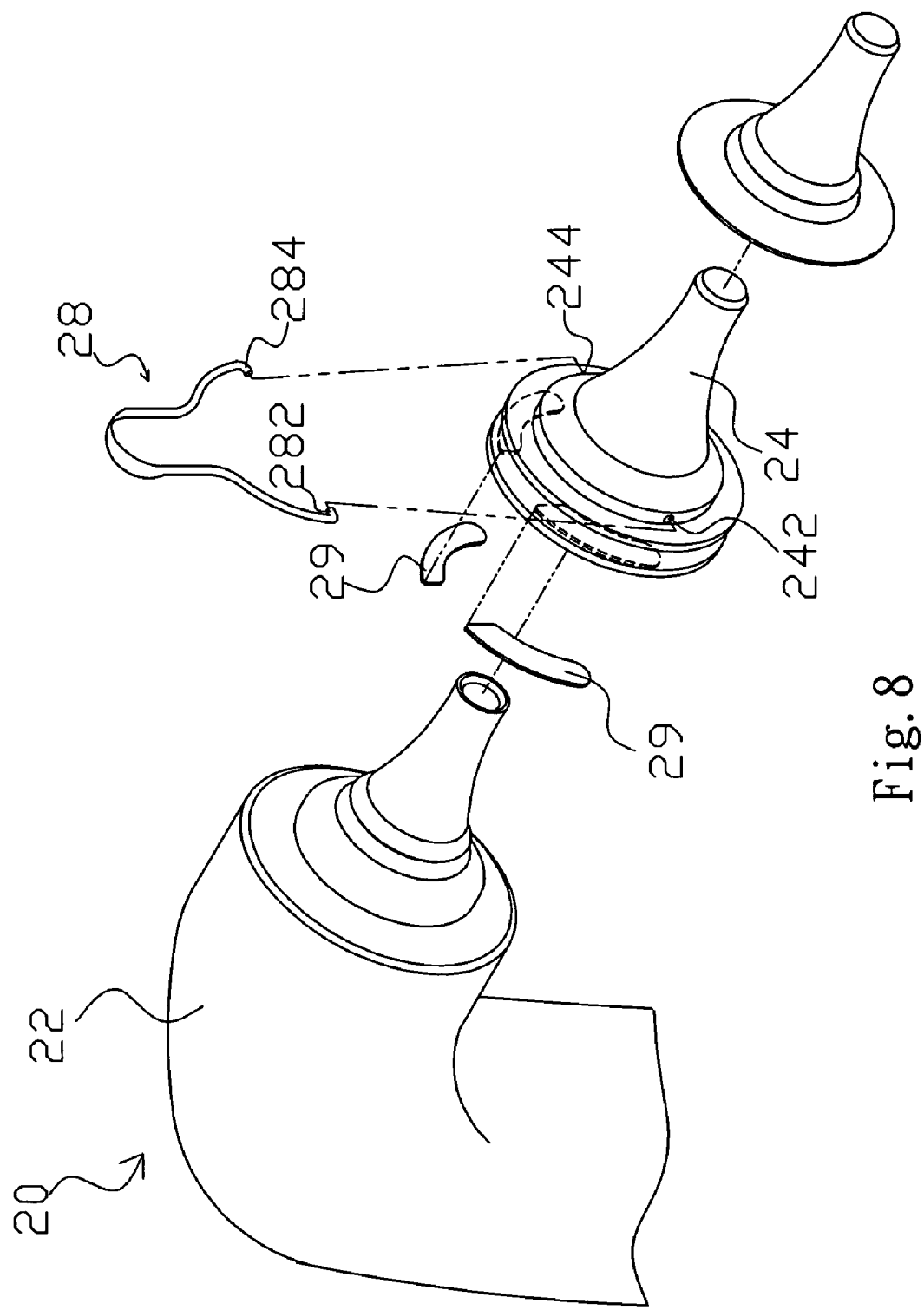
FIG. 8 is an exploded view schematically showing the structure of the embodiment shown in FIG. 7.

Refer to FIG. 7 and FIG. 8 for another embodiment of the present invention. In this embodiment, the detaching element 28 made of a metallic material, and two magnetic elements 29, such as two magnets, are installed to the bottom of the probe 24 and at the positions corresponding to the detaching element 28. In such a design, the user needn't remember to push back the detaching element 28 to its original position, and the attractive force of the magnetic elements 29 can automatically restore the detaching element 28 back to its original position after the user pushes forward the detaching element 28 to reject the probe cover 26 from the probe 24.

Figure 9:
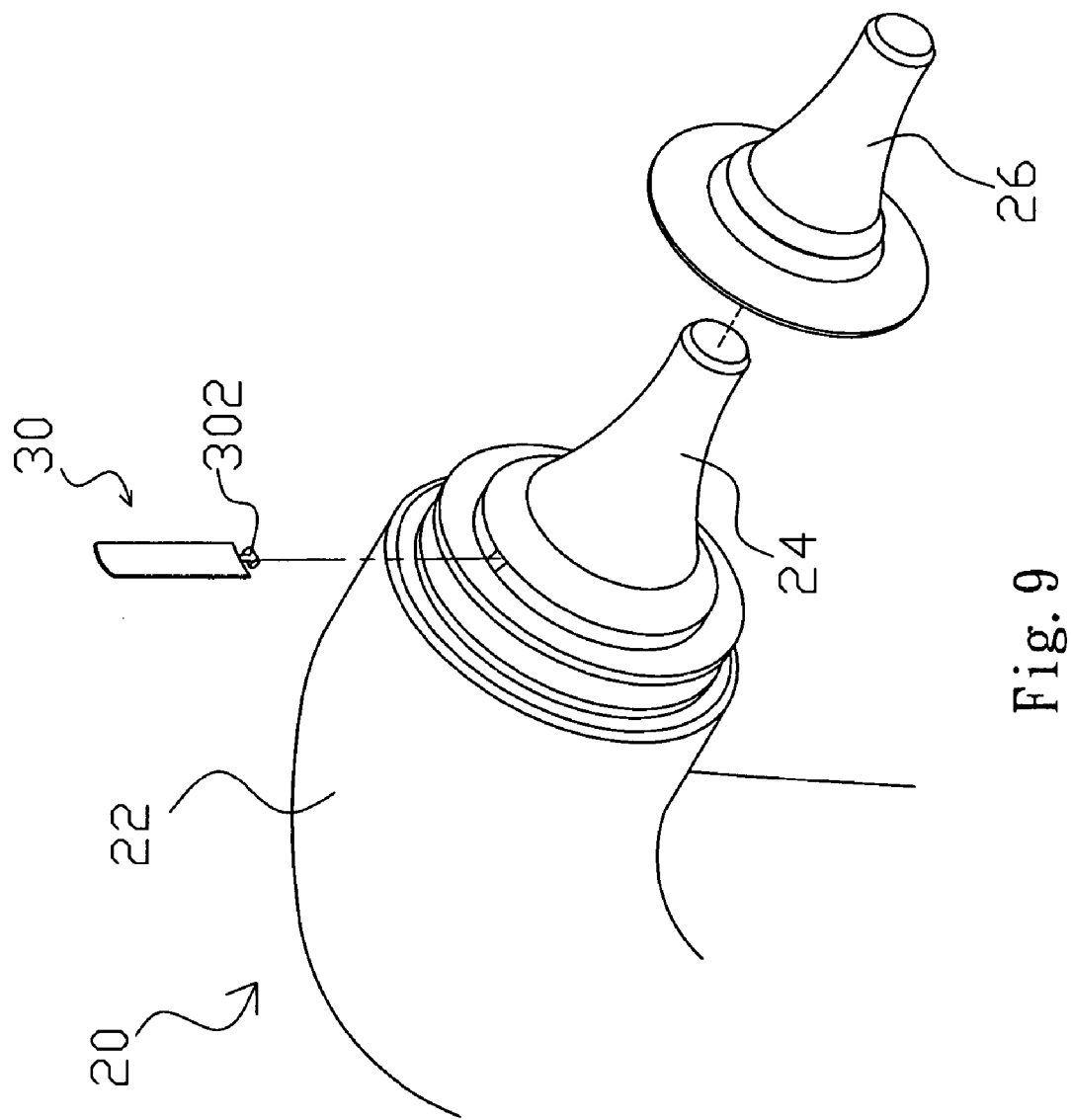
FIG. 9 is a diagram schematically showing still another embodiment of the present invention.

Refer to FIG. 9 for still another embodiment of the present invention. In this embodiment, the bottom of the probe 24 has a press-fit hole 246, and a plate-like detaching element 30 has a press-fit tip 302 corresponding to the press-fit hole 246 of the probe 24. The plate-like detaching element 30 is installed to the bottom of the probe 24 via press-fitting the press-fit tip 302 into the press-fit hole 246, and the plate-like detaching element 30 can thus be moved back and forth pivotally with respect to the press-fit portion. The technical principle of this embodiment is the same as that of the abovementioned embodiment shown in FIG. 2; therefore, it is not described repeatedly here.

Figure 10:
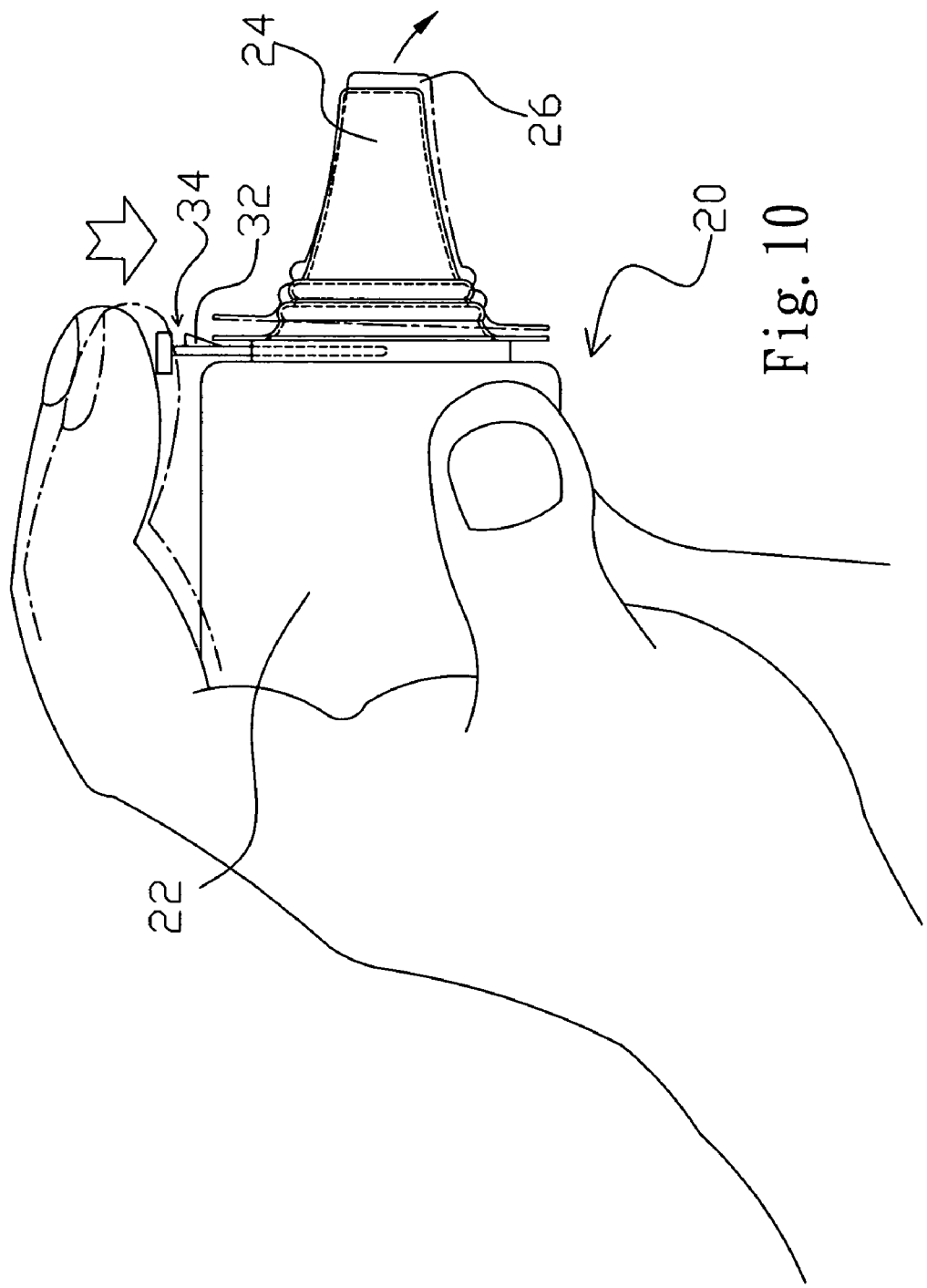
FIG. 10 is a diagram schematically showing further another embodiment of the present invention.

Refer to FIG. 10 for further another embodiment of the present invention. In this embodiment, an elastic element (not shown in the drawing), such as a spring, is installed on the external rim or at the interior of the bottom of the probe 24; a detaching element 34, which has a detaching block 32 at the top thereof, is installed to the top of the elastic element at the probe 24; and the detaching element 34 can move freely up and down from the bottom of the probe 24. After a measurement, the user can use one finger of the hand holding the body 22 to press down the detaching element 34; thus, the detaching blocking 32 will push out the probe cover 26 and reject the probe cover 26 from the probe 24; and then, the elastic force of the elastic element will restore the detaching element 34 back to its original position once the user releases his finger from the detaching element 34.

In the present invention, a detaching element is installed at the bottom of the probe, and the user can use the detaching element to easily reject a probe cover from the probe after a clinical temperature measurement. The present provides an ear thermometer having a simple-structure and low-cost detaching mechanism, which can easily reject a probe cover from the probe with a smaller force. Besides, the invention can solve the problems of the complicated structure and strenuous operation of the conventional probe-cover detaching mechanism.

Those embodiments described above are to exemplify the present invention to enable the persons skilled in the art to understand, make and use the present invention. However, it is not intended to limit the scope of the present. Any equivalent modification and variation according to the spirit of the present invention is to be also included within the scope of the claims stated below.

What is claimed is:

1. An ear thermometer with a simple-structure and easy-operation probe cover-detaching mechanism, comprising:
   a body having a probe at a front end thereof; and
   a detaching element installed to a bottom of said probe and used to exert an outward force on a probe cover sleeving said probe to reject said probe cover from said probe after a measurement, said bottom of said probe having at least one press-fit hole, said detaching element having at least one press-fit tip corresponding to said press-fit hole, said press-fit tip of said detaching element being press-fitted into said press-fit hole of said probe, and said detaching element being movable back and forth pivotally with respect to the press-fit hole.

2. The ear thermometer according to claim 1, wherein said detaching element is made of plastic material or metallic material.

3. The ear thermometer according to claim 1, wherein said bottom of said probe has two symmetric press-fit holes, and said detaching element has a press-fit tip corresponding to each one of said press-fit holes, and each said press-fit tip of said detaching element is press-fitted into the corresponding said press-fit hole of said probe, and said detaching element can be moved back and forth pivotally with respect to the press-fit hole.

4. The ear thermometer according to claim 1, wherein at least one magnet is installed to said bottom of said probe and at a position corresponding to said detaching element; and said magnet can attract said detaching element when said detaching element is made of metallic material.

5. A simple-structure and easy-operation probe-cover detaching element of an ear thermometer, which is installed to a bottom of a probe of an ear thermometer and can be directly operated with a finger to exert an outward force on a probe cover that sleeves said probe during a measurement and then reject said probe cover from said probe, said bottom of said probe having at least one press-fit hole, said detaching element having at least one press-fit tip corresponding to said press-fit hole, said press-fit tip of said detaching element being press-fitted into said press-fit hole of said probe, and said detaching element being movable back and forth pivotally with respect to said press-fit hole.

6. The detaching element of ear thermometer according to claim 5, wherein said detaching element is made of plastic material or metallic material.

7. The detaching element of ear thermometer according to claim 5, wherein said bottom of said probe has two symmetric press-fit holes, and said detaching element has a press-fit tip corresponding to each one of said press-fit holes, and each said press-fit tip of said detaching element is press-fitted into the corresponding said press-fit hole of said probe, and said detaching element can be moved back and forth pivotally with respect to the press-fit hole.

8. The detaching element of ear thermometer according to claim 5, wherein at least one magnet is installed to the bottom of said probe and at a position corresponding to said detaching element; and said magnet can attract said detaching element when said detaching element is made of metallic material.

9. An ear thermometer with a simple-structure and easy-operation probe-cover detaching mechanism, comprising:
   a body having a probe at a front end thereof;
   a metallic detaching element installed to a bottom of said probe; and at least one magnetic element installed to said bottom of said probe and at a position corresponding to said detaching element, wherein said detaching element is used to push forward a probe cover sleeving said probe to reject said probe cover from said probe after a measurement; and then, said magnetic element attracts said detaching element back to the original position, said bottom of said probe having at least one press-fit hole, said detaching element having at least one press-fit tip corresponding to said press-fit hole, said press-fit tip of said detaching element being press-fitted into said press-fit hole of said probe, and said detaching element being movable back and forth pivotally with respect to the press-fit hole.

10. The ear thermometer according to claim 9, wherein said magnetic element is a magnet.

11. The ear thermometer according to claim 9, wherein said bottom of said probe has two symmetric press-fit holes, and said detaching element has a press-fit tip corresponding to each one of said press-fit holes, and each said press-fit tip of said detaching element is press-fitted into the corresponding said press-fit hole of said probe, and said detaching element can be moved back and forth pivotally with respect to the press-fit hole.

* * * * *